United States Patent [19]
Sako et al.

[11] Patent Number: 5,148,422
[45] Date of Patent: Sep. 15, 1992

[54] OPTICAL RECORDING MEDIUM HAVING A DATA RECORDING TRACK WITH OFFSET DATA STORING REGIONS

[75] Inventors: Yoichiro Sako, Chiba; Tamotsu Yamagami, Kanagawa, both of Japan

[73] Assignee: Sony Corporation, Tokyo, Japan

[21] Appl. No.: 570,432

[22] Filed: Aug. 21, 1990

[30] Foreign Application Priority Data

Aug. 25, 1989 [JP] Japan .................. 1-219412
Aug. 25, 1989 [JP] Japan .................. 1-219414
Aug. 31, 1989 [JP] Japan .................. 1-225313

[51] Int. Cl.$^5$ .............................................. G11B 7/00
[52] U.S. Cl. ..................................... 369/44.26; 369/13; 369/100; 369/48; 369/275.1
[58] Field of Search .............. 369/44.26, 44.34, 48, 369/54, 275.1, 275.3, 59, 13, 100; 360/77.03

[56] References Cited

U.S. PATENT DOCUMENTS

| | | | |
|---|---|---|---|
| 3,874,586 | 4/1975 | Foote | 360/2 X |
| 4,364,118 | 12/1982 | Maeda | 369/44.26 |
| 4,432,870 | 4/1984 | Hazel | 369/44.26 X |
| 4,553,228 | 11/1985 | Gerald | 369/48 X |
| 4,561,082 | 12/1985 | Gerald | 369/44.26 X |
| 4,562,564 | 12/1985 | Blicot | 369/44.34 X |
| 4,685,096 | 8/1987 | Romeas | 369/44.34 X |
| 4,761,775 | 8/1988 | Murakami | 369/275.1 X |
| 4,831,609 | 5/1989 | Suzuki | 369/44.26 X |
| 4,858,221 | 8/1989 | Romeas | 369/275.4 X |
| 4,879,708 | 11/1989 | Getseuer | 369/44.26 X |
| 4,985,616 | 1/1991 | Nakamura | 369/44.26 X |

FOREIGN PATENT DOCUMENTS 299573 1/1989 European Pat. Off. .
2099614 12/1982 United Kingdom .

*Primary Examiner*—Roy N. Envall, Jr.
*Assistant Examiner*—Nabil Hindi
*Attorney, Agent, or Firm*—Alvin Sinderbrand; William S. Frommer

[57] ABSTRACT

An optical recording medium for storing optically readable data includes at least one preformed recording track of predetermined width and extending in a predetermined recording direction, the recording track having a recordable region extending in the recording direction thereof for recording data containing clock signal components, the recording track being provided with predetermined offset portions extending in the direction of the width thereof representing offset recorded data, the offset portions being formed such that the offset recorded data has a frequency upon scanning the recording track related by an integral ratio with respect to the clock signal components of the data. When principal information signals are recorded on the track of the recording medium, clock signals are produced with the use of the offset recorded data and, when the principal information signals are reproduced from the recording medium, the offset recorded data are used for accessing, so that record and reproduce clocking may be produced from signals wholly apart from the principal information signals recorded in the recording track. In addition, by providing offset portions of the recording tracks, it is possible to record information outside of the recordable region of the recording track. In one embodiment, the phases of clock components of the principal information signals are recorded therewith so that when these signals are reproduced, a phase locked loop produces reproduced clocking signals having a frequency based upon the offset data signals and a phase determined by the signals recorded in the recordable region. This serves to reduce the time required for frequency and phase capturing and eliminates the need to provide a lengthy clock capturing preamble region in the recording track.

14 Claims, 7 Drawing Sheets

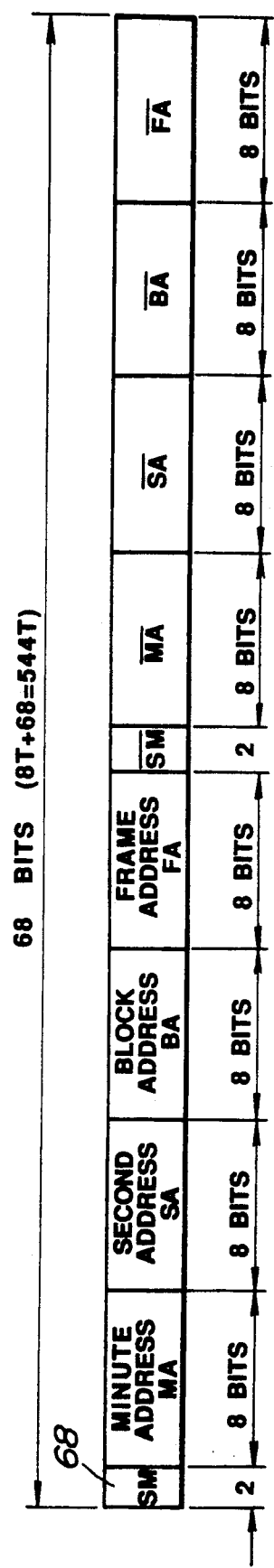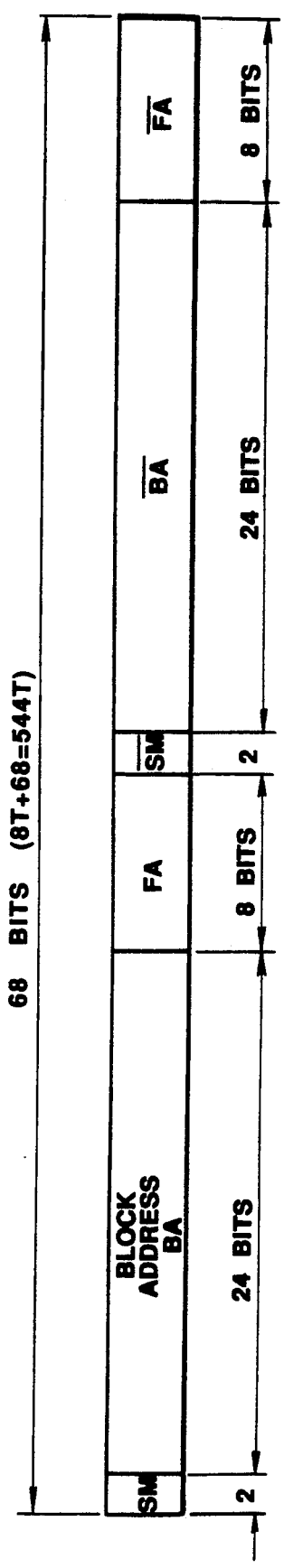

OPTICAL RECORDING MEDIUM HAVING A DATA RECORDING TRACK WITH OFFSET DATA STORING REGIONS

BACKGROUND OF THE INVENTION

1. Field of the Invention

The present invention relates generally to optical recording media and methods for recording and reproducing information therein.

2. Description of the Prior Art

Optical recording media, such as magneto-optical disks, typically include guide grooves (or pregrooves) for tracking which are preformed in a spiral or concentric pattern. Data is recorded by means of the magneto-optical effect in recording tracks either within the guide grooves or in the lands between adjacent guide grooves. In general, address information and data are alternately recorded on the recording tracks. The address information provides a means of controlling the recording and reproducing of the data on a block-by-block or sector-by-sector basis.

Japanese Patent Publication No. 63-87682 (1988) concerns a technique in which wobbling tracks used for detecting tracking errors are recorded after frequency modulation by a time code. In accordance with this technique, a sinusoidal carrier signal of, for example, 22.05 kHz, is frequency modulated by a time code signal having a frequency which is sufficiently low in comparison with the carrier wave to form wobbling tracks. Tracking error signals are produced upon reproduction and the time code is demodulated to produce position information.

However, this technique does not provide the ability to achieve clocking of the recorded signals in the track by means of the track wobbling signals. Moreover, the wobbling signals are not only susceptible to noise but also low in extraction accuracy since timing information is inserted only between blocks of data. Accordingly, they can be decoded only by reading a complete block and, thus, it is difficult to achieve correct positioning.

In addition, in order to read the principal information (such as magneto-optical signals) recorded in the track along its length, it is necessary to provide a relatively long preamble at the leading edge of the recorded principal information in order to regenerate clock signals stored therein which are necessary for reproducing the main information.

OBJECTS AND SUMMARY OF THE INVENTION

It is an object of the present invention to provide an optical recording medium and methods for recording and reproducing information therein which overcome the above described disadvantages and shortcomings of the prior art.

It is another object of the present invention to provide such a recording medium and methods in which clocking of the principal information signals recorded in a recording track of the medium may be achieved with the use of signals preformed by offsetting portions of the track along its width.

It is a further object of the present invention to provide such a recording medium and methods in which correct positioning can be achieved during recording and/or reproduction.

It is a still further object of the present invention to provide a recording medium which permits correct positioning at the time of recording and/or reproduction based upon address information and block leading edge information previously formed by offsetting the recording track along its width, while simultaneously permitting high speed access to a desired block or frame.

It is a still further object of the present invention to provide recording and reproducing methods in which signals for clocking the principal recorded information are captured with the use of signals recorded by offsetting the track along its width together with sync signals recorded in the track to thereby provide correct positioning.

In accordance with one aspect of the present invention, an optical recording medium for storing optically readable data comprises at least one preformed recording track of predetermined width and extending in a predetermined recording direction, the recording track having a recordable region extending in the recording direction thereof for recording data containing clock signal components, the recording track being provided with predetermined offset portions extending in the direction of the width thereof representing offset recorded data, the offset portions being formed such that the offset recorded data has a frequency upon scanning the recording track related by an integral ratio with respect to the clock signal components of the data. It is thereby possible to provide clocking for the data recorded in the track by detecting clock components included in the offset portions thereof, as well as to similarly provide offset recorded signals for achieving synchronization at the level of the predetermined recording unit, such as a frame unit, and for addressing purposes.

In accordance with another aspect of the present invention, a method of recording principal information signals along a recording direction of a recording track provided in an optical recording medium comprises the steps of: providing an optical recording medium having at least one recording track having predetermined offset regions extending in the direction of a width of the recording track, the offset regions being formed to provide offset recorded data including a clock signal component having a frequency bearing an integral ratio with respect to a clock frequency of the principal information signals; and recording the principal information signals with the use of clock signals obtained by reproducing the offset recorded data. It is thereby possible to provide clock signals recording the principal information from the prerecorded track offsets to achieve separate clocking.

In accordance with a further aspect of the present invention, a method for reproducing principal information signals recorded along a recording direction of a recording track formed in an optical recording medium, the recording track having predetermined portions offset with respect to a width thereof representing offset recorded data including clock signal components having a frequency bearing an integral ratio with respect to a clock frequency of the principal information signals, comprises the steps of: reproducing the offset data signals; producing clock signals with the use of the reproduced offset data signals; and reproducing the principal information signals with the use of the clock signals. It is thereby possible to access the principal information signals with the use of the offset data signals.

The above, and other objects, features and advantages of the invention, will be apparent in the following detailed description of certain illustrative embodiments thereof which is to be read in connection with the accompanying drawings forming a part hereof, and wherein corresponding parts and components are identified by the same reference numerals in the several views of the drawings.

BRIEF DESCRIPTION OF THE DRAWINGS

FIG. 2 illustrates a first exemplary address format which may be employed in the recording format of FIG. 1;

FIG. 3 illustrates a second exemplary address format which may be employed in the recording format of FIG. 1;

DESCRIPTION OF CERTAIN PREFERRED EMBODIMENTS

Figure 1:
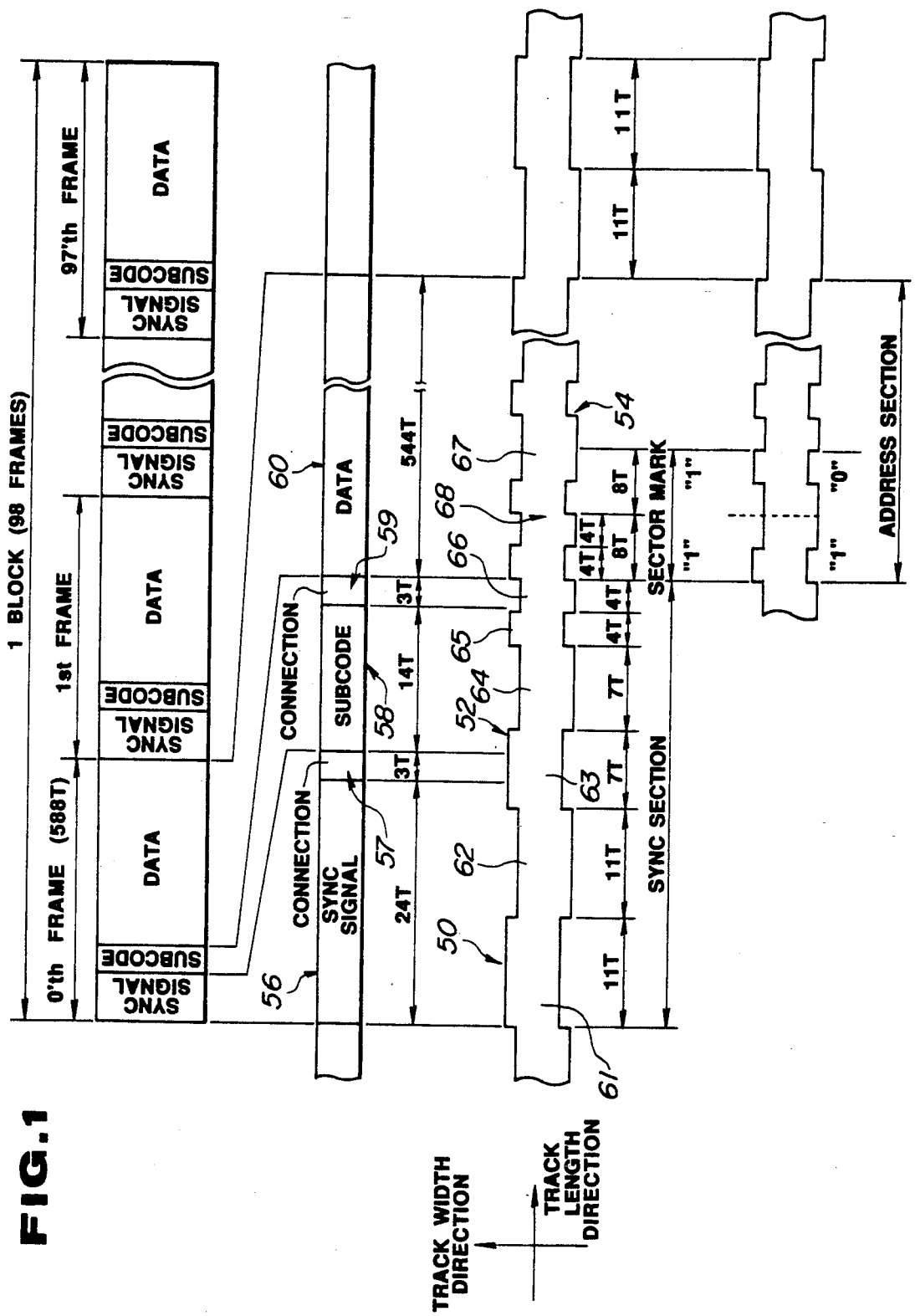
FIG. 1 illustrates a recording format for an optical recording medium in accordance with a first embodiment of the present invention.

With reference first to FIG. 1, a recording format of a recording medium in accordance with a first embodiment of the present invention is illustrated therein in the form of a magneto-optical disk wherein information is recorded by offsetting portions of a track 50 thereof along its width to thereby store information. The magneto-optical disk of FIG. 1 includes a vertically magnetized film having magneto-optical properties and disposed on a transparent base plate. One or more spirally or concentrically extending tracking guide grooves, also known as "pregrooves", are preformed in the magneto-optical disk to define recording tracks either in the pregrooves or in the lands therebetween. The tracks are formed with a plurality of portions, such as portions 52 and 54, offset in the direction of the track width in order to provide reproduce-only subsidiary information including at least certain control signals, such as sync signals or clock signals.

In one specific example of a recording format for the principal information which is recorded along the length or recording direction of the recording track 50, a format similar to that used in recording data in a compact disc (also known as a "CD") is employed. In accordance with this example, each block or sector of the recording track which functions as the information recording unit includes 98 frames designated sequentially from the 0'th to the 97'th frame. Each such frame has a length equivalent to 588 channel clock periods T (that is, 588T) of the principal information recorded along the length of the recording track and includes recording regions for frame sync signals, subcodes and data, including parity data. As illustrated in FIG. 1, a frame sync signal region 56 having a length equivalent to 24T is provided at the leading edge of each frame, followed sequentially by a connection region 57 having a length equivalent to 3T, a subcode region 58 having a length equivalent to 14T and a further 3T connection region 59. The remaining region of the frame is a data region 60 having a length equivalent to 544T which serves to record 32 words or bytes of sample data and parity data modulated according to an eight-to-fourteen modulation (EFM) technique. The foregoing frame sync signal is provided in the form of an out-of-rule pattern of two successive 11T transitions, while the 14T subcode region 58 provides a single byte of data.

FIG. 1 also illustrates a specific example of the recording of subsidiary information signals by offsetting portions of the recording track in the direction of its width. In this example, the recorded information takes the form of sync signals recorded in a leading section of each frame having a length equivalent to 44T and including two successive 11T transition segments 61 and 62, followed successively by a pair of 7T segments 63 and 64 and a pair of 4T segments 65 and 66. In a 544T data region 67 following this leading section of each frame, additional subsidiary information is recorded in the form of offset portions of the recording track which, in this example, represent address information wherein the offset portions each have a length equivalent to an integral multiple of the channel clock period T of the principal information to be recorded in the recording track. In the embodiment of FIG. 1, the information recorded by offsetting in the direction of the track width is phase encoded (PE) with a bit slot of 8T; alternatively, a biphase mark system in accordance with an eight-to-fourteen modulation (EFM) technique may also be used. The sync signals recorded in the manner described above are used for frame synchronization, while the first two 8T segments of the 544T data region 67 provide a pair of bits 68 representing synchronizing sector (or block) marks SM for block or sector synchronization, each block or sector consisting of 98 frames in this example. That is, as a means of distinguishing the first frame of each block from the remaining frames thereof, the initial two bits of the initial frame's data region are phase encoded with a value "11", while the corresponding offset portions of the remaining frames of the block are phase encoded with a value "10".

Referring to FIG. 2, the data format for information recorded in the offset portions of the recording track corresponding with the 544T data region of each frame is illustrated therein. In this example, following the above described sector mark 68 are successively arranged an 8-bit binary coded decimal (BCD) minute address (MA), an 8-bit (BCD) second address (SA), an 8-bit (BCD) block address (BA), and an 8-bit (BCD) frame address (FA) including a total of 34 bits each occupying a length equivalent to 8T and altogether occupying onehalf of the 544T data region. The remaining half of the data region includes a further 34 bits of offset data corresponding with the inverse of the data recorded in the first half of the data region so that the sector mark, minute address, second address, block address and frame address are recorded twice in each frame by offsetting portions of the track along its width.

In one advantageous embodiment, the foregoing addresses are recorded in the standard compact disk (CD) format in which the minute address has a range of "00" to "99", the second address has a range of "00" to "59" and the block address has a range of "00" to "74", expressed in binary coded decimal format. Accordingly, the foregoing minute, second and block addresses provide a total of 450,000 separate addresses. In this example, the frame address has a range of "00" to "97" also expressed in binary coded decimal format.

Since the block address is recorded twice in each frame by means of offsetting the track as described above, the block address is readily obtained by reading only a single frame as opposed to prior recording formats which require the reproduction of an entire block of information to access its address. In this advantageous embodiment, therefore, high-speed accessing is enabled by reading the block address at the position of any frame therein. Moreover, since a total of 196 block addresses are L recorded in a block totaling 98 frames, it is unlikely that the block address will prove unreadable, thus providing improved reliability. In contrast to the preexisting CD format, the provision of frame addresses in the present embodiment enables accessing on a frame-by-frame basis. Also, the provision of a sector mark at the leading edge of each frame enables the ready identification of the leading edge of each block.

Referring to FIG. 3, a further embodiment of an address format recorded in the form of offset portions of a recording track is illustrated therein. The format as illustrated in FIG. 3 includes a 24 bit block address BA including the 24 bits of the minute, second and block addresses, MA, SA and BA of FIG. 2, followed in sequence by an 8-bit frame address. The embodiment of FIG. 3 is especially useful for addressing data recorded in a disk having a recording density in excess of that provided by the conventional CD format. In this respect, the 24 bit combined address of FIG. 3 provides the ability to identify $2^{24}$ or 16,777,216 separate address locations.

Figure 4:
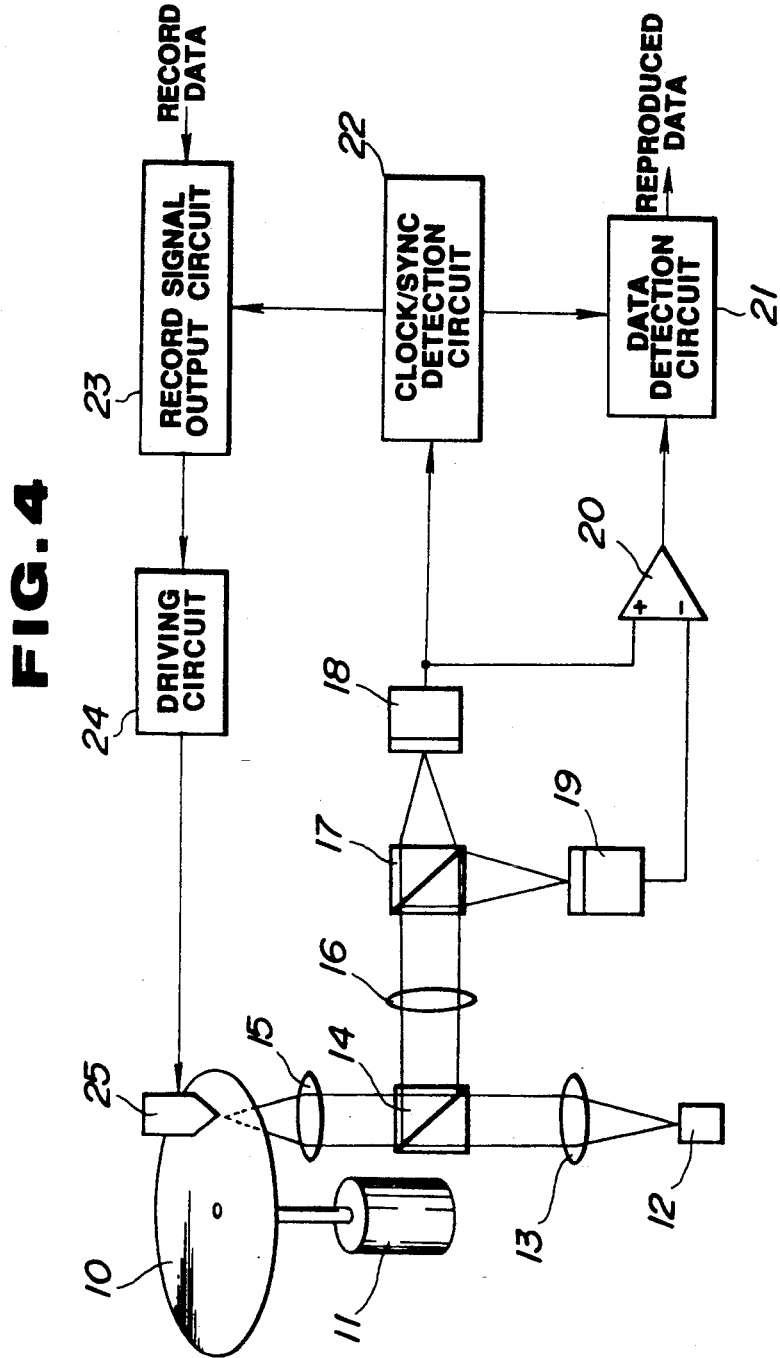
FIG. 4 is a block diagram illustrating a magnetooptical recording/reproducing apparatus for recording and reproducing data in an optical recording medium in accordance with the recording and reproducing methods of the present invention.

With reference now to FIG. 4, an apparatus is illustrated therein which is operative in accordance with the methods of the present invention for recording and/or reproducing principal information on or from the recording track of a magneto-optical disk in which subsidiary data, such as addresses, are recorded by offsetting portions of the recording track in the direction of its width. In the apparatus of FIG. 4, a magnetooptical disk 10 is provided with a spirally or concentrically extending recording track or tracks having offset portions for recording subsidiary information. A spindle motor 11 of the FIG. 4 apparatus is operative to drive a magneto-optical disk 10 rotationally at a constant linear or angular velocity. A laser light source 12, such as a laser diode, is operative to generate a laser beam for recording and/or reproduction. The laser beam is collimated by a collimator lens 13 and the collimated beam therefrom is intercepted by a beam splitter 14 from which the beam emerges to an object lens 15 in the form of a biaxial device which, in turn, serves to focus and track the beam along the surface of the magneto-optical disk 10.

Light reflected from the magneto-optical disk 10 reenters the beam splitter 14 from which it is directed to a polarization light splitter 17 by way of an optical system 16, such as a one-half wavelength plate, converging lens or cylindrical lens. The beam incident on the polarization light splitter 17 is separated thereby into a P polarization light component which the light splitter 17 projects on the surface of a first photodetector 18, and an S polarization light component which the light splitter 17 projects onto the surface of a second photodetector 19. The first and second photodetectors 18 and 19 are adapted for detecting the tracking error signals, focusing error signals and magneto-optical (MO) signals contained in the reflected laser light beam.

An output of the first photodetector 18 is supplied to a noninverting input of a differential amplifier 20, while an output of the second photodetector 19 is supplied to an inverting input terminal of the differential amplifier 20. Differential amplifier 20 produces an output signal proportional to a difference between the output signals from the first and second photodetectors 18 and 19 in order to extract the magneto-optical (MO) signals present in the signals output thereby. The magneto-optical signals output by the differential amplifier 20 are supplied thereby to an input of a data detection circuit 21.

The first photodetector 18 is also operative to detect tracking error signals and focusing error signals through the use of appropriate means, such as a 4-segment light receiver. The subsidiary information recorded in the track offsets as described above is contained in the high frequency components of the tracking error signals. These high frequency components include clock signal components which bear an integral ratio with respect to the clock frequency of the principal information recorded in the recording track and also include sync signals (for example, frame sync signals) which provide synchronization at the predetermined recording unit of the principal information. The high frequency components produced by the first photodetector 18 are supplied thereby to an input of a clock/sync signal detection circuit 22 for detecting the clock/sync signals therein. A first output of the clock/sync detection circuit 22 is connected with an input of the data detection circuit 21 to supply the clock/sync signals thereto for use in extracting the data contained in the magneto-optical signals which the circuit 21 supplies as reproduced data at an output terminal thereof.

In recording information magneto-optically in the disk 10, the FIG. 4 apparatus reproduces the address information stored in the disk 10 in the offset portions of the recording track in order to access the disk for recording the principal information in a recording track thereof. Then, the clock/sync signals produced by the detection circuit 22 from the high frequency components of the offset signals produced by the first photodetector 18 are supplied at a second output of the circuit 22 connected with a first input of a record signal output circuit 23. The record signal output circuit 23 receives data to be recorded at a second input thereof which it is operative to demodulate with the use of the clock/sync signals received from the circuit 22. The record signal output circuit 23 provides a demodulated data signal at an output terminal thereof connected with an input terminal of a magnetic field modulating drive circuit 24 which is operative to modulate a magnetic field produced by a magnetic head 25 in accordance with the demodulated signal supplied to the driving circuit 24 in order to supply a corresponding magnetic field to the magneto-optical disk 10. Simultaneously therewith, a writing laser beam supplied by the laser light source 12 is applied to the disk 10 to effect photomagnetic recording of the signal supplied by the record signal output circuit 23 along the length of a selected recording track of the disk 10. It will be appreciated that the sync signals provided by the offset portions of the recording track may also be used for accessing the disk, as well as for demodulating the data received by the circuit 23. It will also be appreciated that the apparatus of FIG. 4 may be readily adapted for use as an optical modulation system, in place of the magnetic field modulation system described hereinabove.

By providing frame sync signals and/or clock signal components in the form of offset portions of the recording track which are related by an integral ratio with respect to the clock signal frequency of the principal information stored in the tracks, clock signals for reproducing or recording principal information signals are provided by a source which is completely separate therefrom, which assures accurate frame-by-frame positioning, thus facilitating disk access. Accordingly, it is unnecessary to provide a buffer for absorbing jitter caused by fluctuations in the rotation of the disk, as is required in prior systems wherein clocking or synchronization is achieved only with the use of the principal information signals recorded or to be recorded in the recording track. In addition, by providing address information in the form of track offsets, high accuracy designation and accessing of the frames or blocks at the time of recording and/or reproduction, respectively, is provided. It will be appreciated that recording media, such as optical disks in which sync, address and/or similar information is prerecorded in the form of track offsets, may be mass produced easily by press working during manufacture with the use of a master disk and a stamper.

Further advantageous embodiments of the present invention are now explained with reference to FIGS. 5–9, in which both offset data and data recorded magneto-optically are utilized for clocking.

Figure 5:
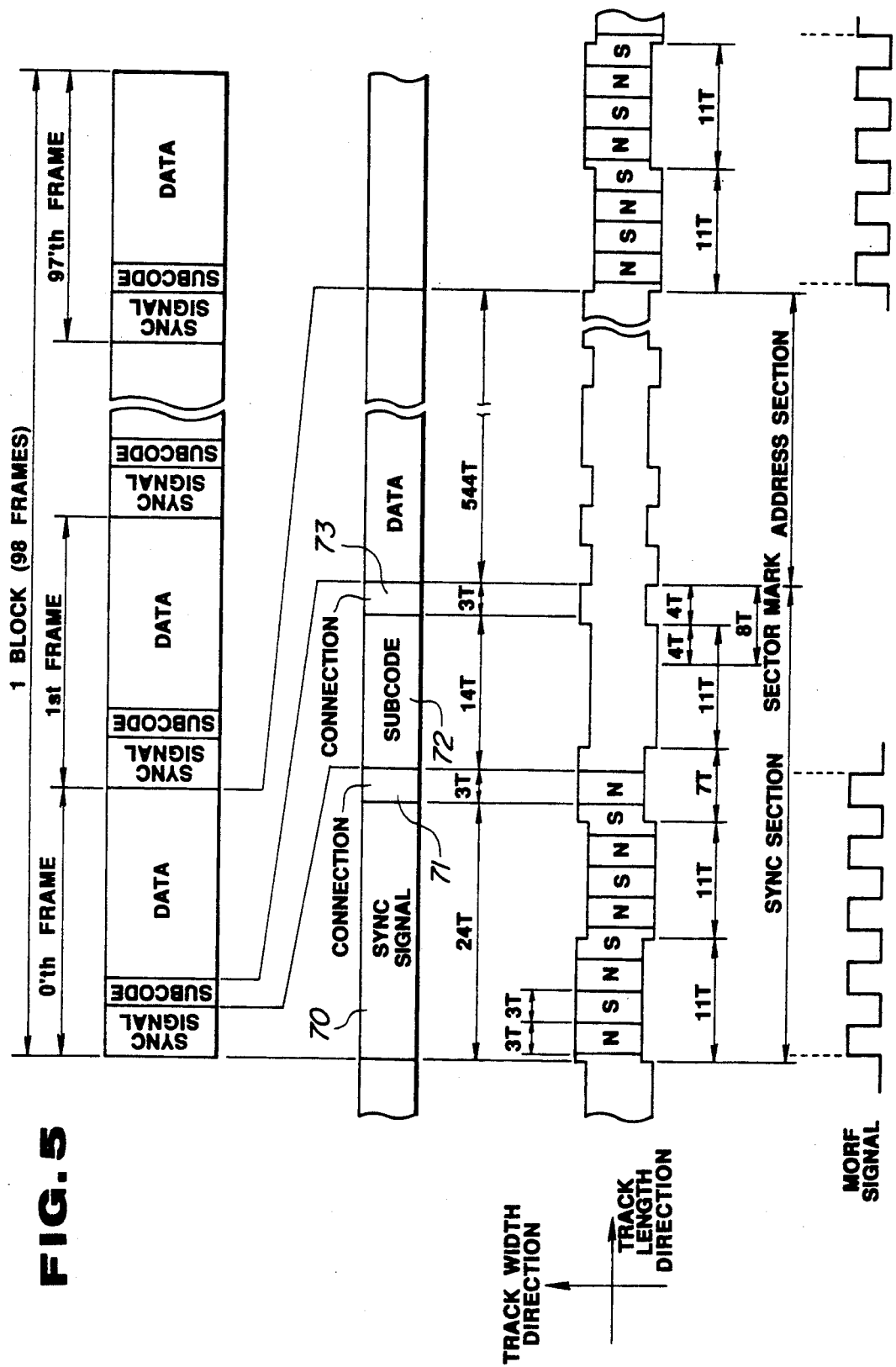
FIG. 5 illustrates an exemplary recording format employed in a method according to the present invention for recording in an optical recording medium.

Referring to FIG. 5, a recording format in accordance with a further embodiment of the present invention is provided for recording principal information along the length of a recording track and is similar to the compact disk (CD) format. That is, a single block or sector constituting an information recording unit of the FIG. 5 format includes 98 frames designated successively the 0'th to the 97th frame wherein each frame has a length equivalent to 588 times the channel clock period T or 588T. Each such frame includes respective regions for recording sync signals, subcodes and data, including parity data. A 24T sync signal region 70 is provided at the leading edge of each frame, followed successively by a 3T connection bits region 71, a 14T subcode region 72 and a second 3T connection bits region 73. In the remainder of the frame, 32 words or bytes of EFM modulated sample and parity data are recorded. Sync signals are recorded magneto-optically in the sync signal region 70 and the following 3T connection bits region 71 in the form of 9 successive 3T transition distances. An EFM time code provided in the CD format is recorded as a single word in the 14T subcode region 72.

Figure 6:
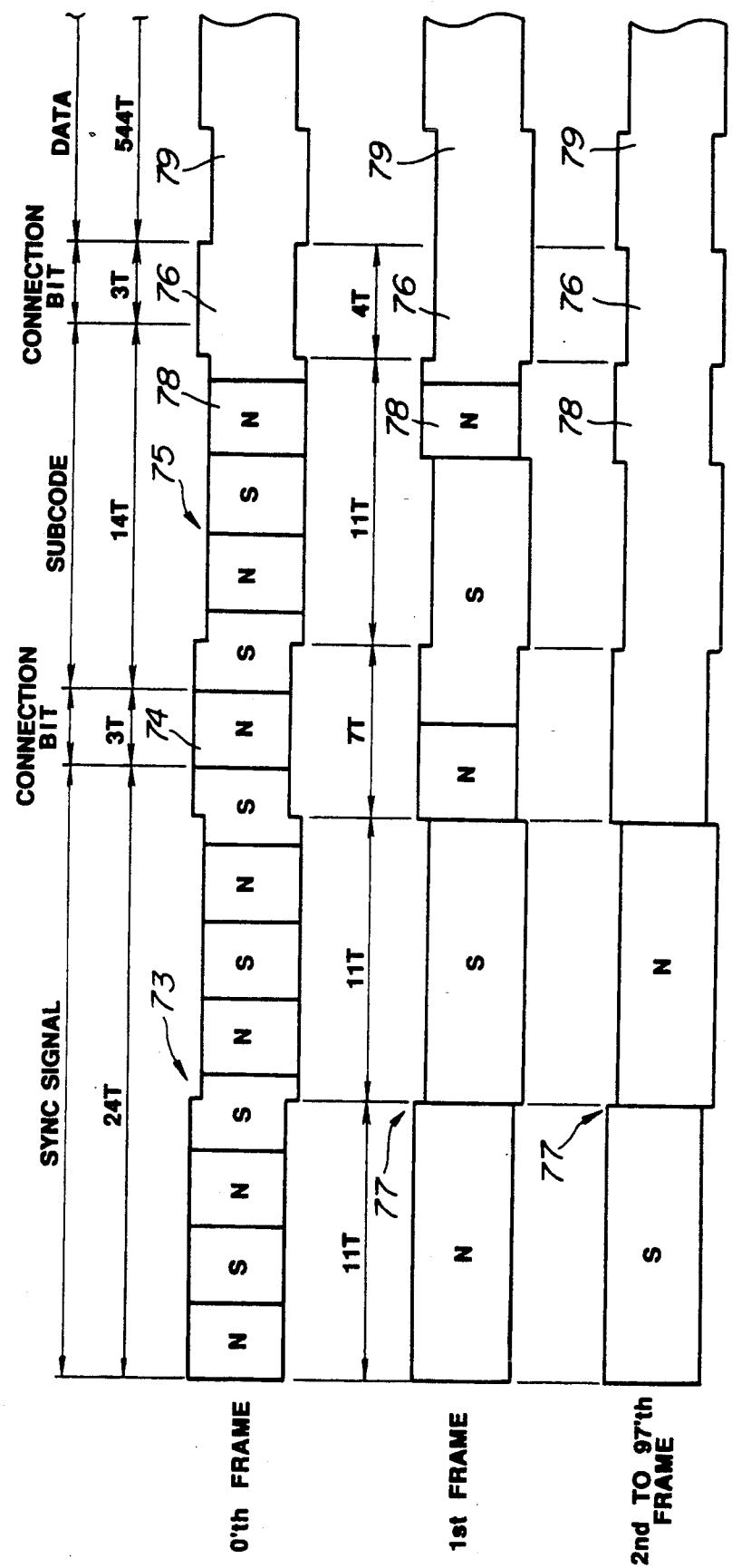
FIG. 6 illustrates a further exemplary recording format employed in a method according to the present invention for recording in an optical medium.

Another recording format in accordance with a further embodiment of the present invention is illustrated in FIG. 6. Similarly to the format of FIG. 5, the format as illustrated in FIG. 6 includes a 24T sync signal region 73 at the leading edge of each frame, followed successively by a 3T connection bits region 74, a 14T subcode region 75 and a further 3T connection bits region 76. As illustrated in FIG. 6, in the 0'th frame, a pattern of 13 successive 3T transition distances, alternatively designated "N" and "S" to represent the polarities thereof, is recorded in the 24T sync signal region 73, the successive 3T connection bits region 74 and the 14T subcode region 75, while a pattern of two successive 11T transition distances is recorded similarly in a 24T sync signal region 77 in each of the first through the 97th frames. This pattern of two successive 11T transition distances is referred to as an out-of-rule pattern which is not provided in the EFM system and is used for frame synchronization.

The recording tracks illustrated in FIGS. 5 and 6 also include preformed offsets in the direction of the track width which serve to record subsidiary information signals. In this manner, sync signals are recorded in the first 44T transition distances at the leading edge of each frame including two successive 11T transition distance offset portions followed successively by a 7T offset portion, and 11T region and a 4T offset portion. The 11T region is constituted either by a single 11T offset portion (in the case of the 0'th frame) or by a pair of 7T and 4T offset portions (in the case of the 1st through 97th frames). The sync signals thus provided are used for frame synchronization. In addition, the offsets provided in the final pair of 4T transition distances of the 44T region as illustrated in FIG. 6 also provide block or sector synchronization. As shown in FIG. 6, this pair of 4T transition distances (designated 78 and 76) of the first (or 0'th) frame of the block is distinguishable from the remaining frames as the final two 4T transition distances are phase encoded to represent a "0" value by virtue of the signal rise at the end of the first 4T transition distance, thus providing a sector mark at the leading edge of its respective block. It will be seen with reference to FIG. 6 that the same the two 4T transitions distances 78 and 76 of the remaining frames of the block phase encode a value "1" in order to distinguish those frames from the 0'th frame.

In the remaining 544T data region of each frame additional subsidiary data, such as address data are recorded by offsetting the track in the direction of its width. The length of the offset portions are selected to correspond with an integral multiple of the channel clock period T of the principal information recorded in the recording track. In the example of FIG. 5, clocking information is recorded by track offsetting in accordance with a PE modulation scheme wherein each bit slot is equivalent to 8T. Where the clock period is an integral ratio of the channel clock period, a biphase mark modulation scheme in accordance with an EFM technique may also be used. In the example of FIG. 5, wherein offset data is recorded utilizing the above mentioned PE scheme, wherein one bit slot is equal to 8T, a total of 68 bits of data (that is, 544/8) can be recorded in the 544T data region 79. Within this limitation, 8 bit BCD minute, second and block addresses according to the established CD format, together with an 8 bit BCD frame address and a 2 bit sector mark, totaling 34 bits, are recorded twice per frame, first in a non-inverted format and then in an inverted format.

Figure 7:
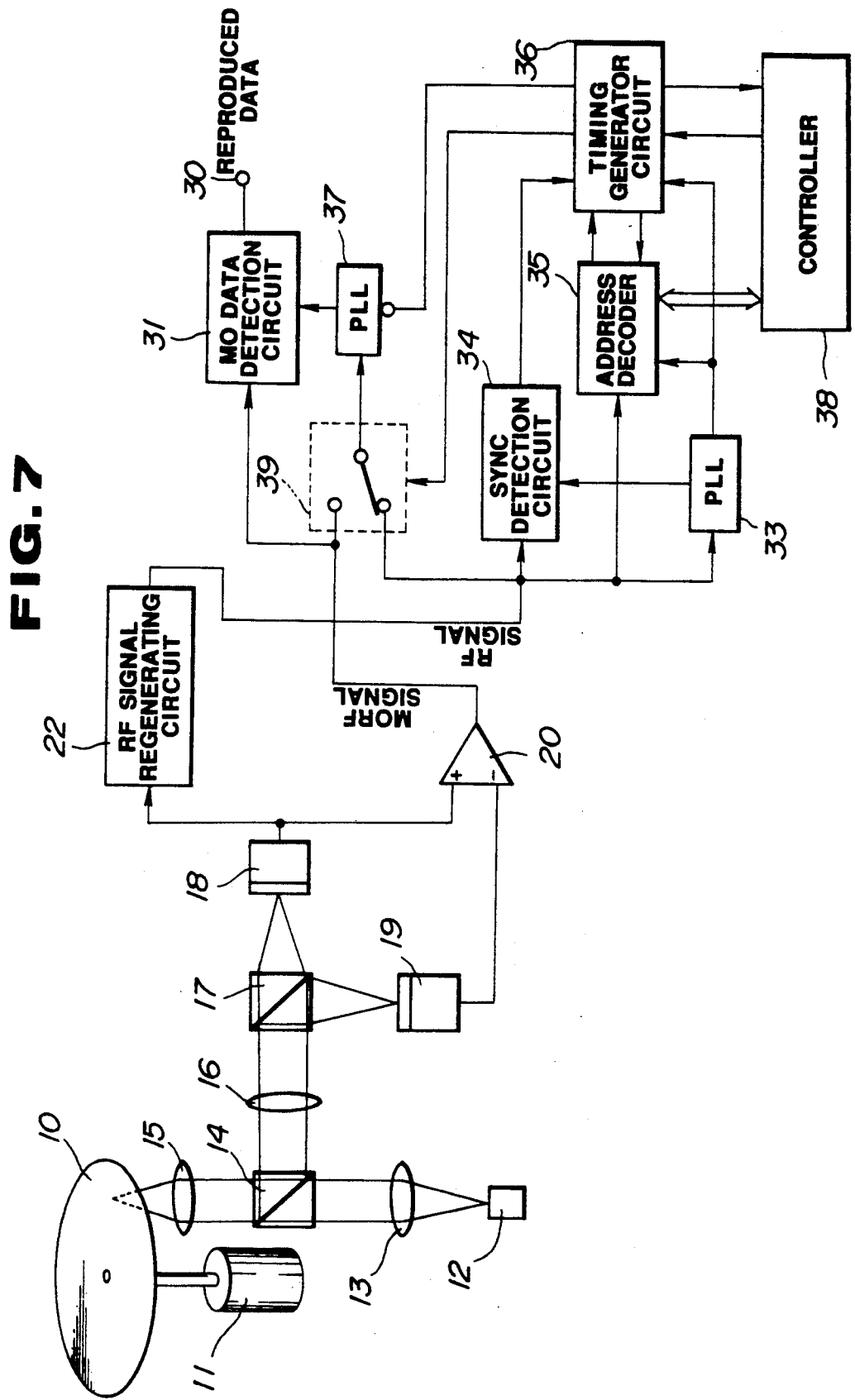
FIG. 7 is a block diagram illustrating an apparatus useful in practicing a method in accordance with the present invention for reproducing data from an optical recording medium.

With reference now to FIG. 7, an apparatus for reproducing magneto-optically recorded information from the recording track of a magneto-optical disk in accordance with a method of the present invention is illustrated therein, in which subsidiary information, such as address information, is recorded in the form of track offsets and sync signals are recorded in the recording track as magneto-optical signals. In the apparatus of FIG. 7, elements corresponding with those of the FIG. 4 apparatus bear the same reference numerals. The magneto-optical RF signal (MORF signal) output by the differential amplifier 20 is supplied thereby to the input of a magneto-optical (MO) data detection circuit 31 corresponding with the data detection circuit 21 of FIG. 4. The first photodetector 18 supplies the tracking error signals and focusing error signals produced thereby to an RF signal regenerating circuit 32 which is operative to extract RF subsidiary signals recorded as track offsets from the high frequency components of the tracking error signals. The RF signal regenerating circuit 32 outputs the high frequency components of the tracking error signal including clock signal components having the same frequency as the clocks of the principal information recorded magneto-optically in the recording track, together with sync signals providing synchronization at the level of the predetermined recording unit of the principal information, such as frame sync signals.

The high frequency components of the tracking error signal or RF signal output by the, regenerating circuit 32 are supplied thereby separately to a phase locked loop (PLL) 33, a sync detection circuit 34 and an address decoder 35 for detecting the clock and frame sync signals. The oscillation frequency of the PLL 33 is thus synchronized with the frequency of the clock components contained in the RF signal. The clocks produced by the PLL 33 are provided thereby to the sync detection circuit 34, address decoder 35 and to a timing generator circuit 36. The sync detection circuit 34 is operative to detect the sync signals present in the high frequency components output by the RF signal regenerating circuit 32 with the use of the clock synchronized output of the PLL 33. The sync signals thus detected by the sync detection circuit 34 are provided thereby to the timing generator 36. The address decoder 35 is operative to decode the frame address present in the output from the RF signal regenerating circuit 32 and outputs the decoded frame address to a controller 38.

The timing generator circuit 36 and the controller 38 together govern the operation of a phase locked loop (PLL) 37 and a changeover switch 39. The PLL 37 is operative to supply clocks to the magneto-optical data detection circuit 31 for detecting the principal information recorded magneto-optically in the recording track 50 which it supplies as reproduced data to an output terminal 30 of the FIG. 7 apparatus. The PLL 37 is synchronized either with the clock signal components recorded magneto-optically in the recording track or with the clock signal components recorded as track offset signals, depending on the state of the switch 39 as controlled by the timing generator circuit 36 and the controller 38.

Figure 8:
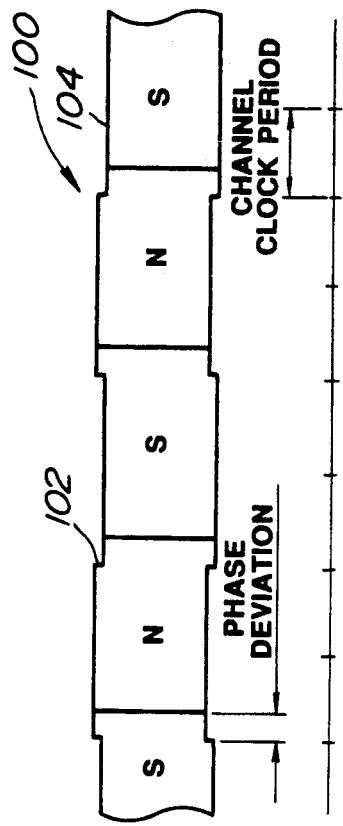
FIG. 8 is a diagrammatic view illustrating a recording track of a magneto-optical disk in accordance with the present invention wherein magneto-optical signals are recorded and subsidiary information is stored by offsetting portions of the track along its width.
Figure 9:
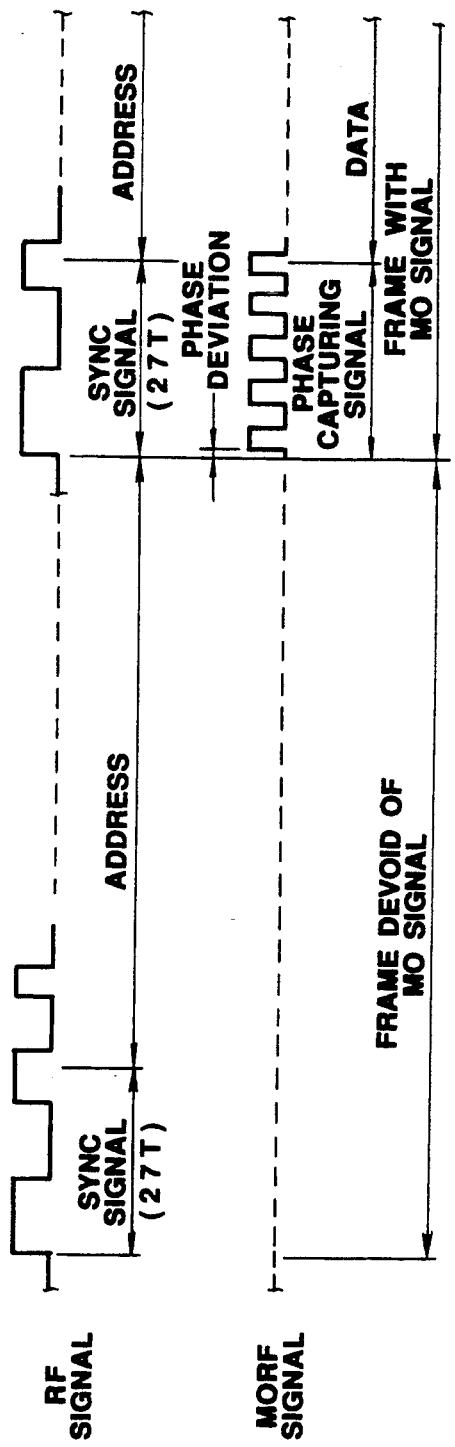
FIG. 9 illustrates waveform diagrams of signals reproduced from the recording track of FIG. 8 including signals reproduced from the offset portions of the track as well as magneto-optical signals recorded in the track along the length thereof.

The operation of the timing generator circuit 36 and the controller 38 are explained with reference to FIGS. 8 and 9. Referring first to FIG. 8, a recording track 100 of the magnetooptical disk 10 is illustrated therein in which a plurality of magneto-optical signals indicated by their respective magnetic polarities N or S are recorded therein. The recording track 100 is also provide with a plurality of offset portions, such as portions 102 and 104, recording subsidiary information. With reference also to FIG. 9, and RF signal reproduced from the offset portions of the recording track 100 of FIG. 8 is illustrated therein together with a corresponding magneto-optical RF (MORF) signal reproduced from the same recording track 100.

Referring again to FIG. 8, in general, when magneto-optical signals are recorded in the track 100, the clock components recorded as offset portions of the track are detected in order to synchronize the recording of the magneto-optical signals therein. However, there typically is a time delay between the reading of the offset portions to detect the clock signals and the recording of the magneto-optical signals, for example, due to delays introduce by PLL filters or in the circuits which write the magneto-optical signals. Accordingly, the magneto-optical signals as recorded are delayed slightly with respect to th corresponding offset portions of the track so that a phase deviation therebetween results. That is, the clock phase of the magneto-optical signal in the recording track differs from that of the offset signal, so that errors may e produced when the principal information is reproduced with the use of clocks detected by reading the offset portions only.

In the apparatus of FIG. 7, this potential source of error is eliminated by first utilizing the sync signals or address data recorded in the track offsets for capturing the clock frequency thereof in the output of the PLL 37 at a time when a frame devoid of magneto-optical signals is being reproduced, as illustrated in the left-hand portion of the FIG. 9 waveforms. At this time, the timing generator circuit 36 and the controller 38 are operative to control the changeover switch 39 to supply the RF signal from the RF signal regenerating circuit 32 as a reference input to the PLL 37 to accomplish frequency stabilization with the use of the offset signals. At the beginning of the succeeding frame which has a magneto-optical signal recorded therein, the timing generator circuit 36 is operative to temporarily disable the phase comparator of the PLL 37 as the state of the switch 39 is changed in order to supply the magneto-optical RF signal as a reference to the PLL 37, thus to avoid the adverse effects of chatter occurring when the state of the switch 39 is changed. Once the switch 39 has stabilized thereafter, the timing generator circuit 36 re-enables the phase comparator of the PLL 37 which then is operable to capture the phase of the magneto-optical RF signal so that the output of the PLL 37 is matched in phase and frequency to the clocks contained in the magneto-optical RF signal in order to supply a phase and frequency matched clock to the magneto-optical data detection circuit 31 to accurately reproduce the principal information recorded magneto-optically in the recording track.

Optical data recording techniques which do not make use of track offsetting in accordance with the present invention for recording clock components require the provision of a long preamble region in the recording track wherein clock components are written in order to permit satisfactory extraction thereof. However, in regions of the recording track where magneto-optical signals are not written, it is not possible to operate a PLL for clock detection. Through the use of track offsets in accordance with the present invention, it is possible to synchronize the output of a PLL with the appropriate clock frequency even where no magneto-optical signal is available. Accordingly, a significantly shorter preamble of magneto-optical sync signals may be provided for phase capturing since the clock frequency has already been captured, so that the PLL may be stabilized in a shorter period of time.

Recording media on which subsidiary data, such as sync data or address data, are prerecorded by means of track offsets, such as magneto-optical disks, may be readily mass-produced by means of a press working process when the disks are manufactured using a master disk or a stamper.

It will be appreciated that the present invention is equally applicable to organic dye based optical disks, various types of write-once disks or overwrite disks, optical cards and magneto-optical cards. It will also be appreciated that software program data may likewise be recorded by track offsetting in accordance with the present invention. The recording formats disclosed herein are intended to be illustrative and not limiting.

Accordingly, although specific embodiments of the invention have been described in detail herein with reference to the accompanying drawings, it is to understood that the invention is not limited to those precise embodiments, and that various changes and modifications may be effected therein by one skilled in the art without departing from the scope or spirit of the invention as defined in the appended claims.

What is claimed is:

1. An optical recording medium for storing optically readable data, comprising at least one preformed recording track of predetermined width and extending in a predetermined recording direction, said recording track having a recordable region extending in said predetermined recording direction for holding first data containing clock signal components therein, said recording track being provided with predetermined offset portions extending in the direction of the width thereof representing second, offset recorded data, at least some of said predetermined offset portions being positioned along the predetermined recording direction at locations corresponding with portions of the recordable region holding at least some of said first data such that the offset recorded data held by said at least some of said predetermined offset portions and said at least some of said first data are simultaneously reproducible by a single beam of light, said offset portions being formed such that the offset recorded data has a frequency when reproduced upon scanning said recording track related by an integer ratio with respect to the clock signal components of said first data.

2. The optical recording medium according to claim 1, wherein said offset recorded data includes predetermined frame sync signals each identifying a respective frame constituting an information recording unit of said first data.

3. The optical recording medium according to claim 2, wherein said offset recorded data includes predetermined address information for addressing a predetermined number of said frames.

4. The optical recording medium according to claim 3, wherein said address information includes block address information for indicating a block constituting a respective plurality of said frames.

5. The optical recording medium according to claim 3, wherein said offset recorded data includes predetermined block leading edge information for identifying a leading edge of a corresponding block of frames recorded in said recording track.

6. The optical recording medium according to claim 5, wherein said offset recorded data includes predetermined information associated with each frame indicating whether said frame is the leading frame of the corresponding block.

7. The optical recording medium according to claim 1, wherein the optical recording medium is a magneto-optical disk.

8. A method of recording principal information signals along a recording direction of a recording track provided in an optical recording medium, comprising the steps of:

providing an optical recording medium including at least one recording track having a recordable region and having predetermined offset regions extending in the direction of a width of said recording track and positioned along the recording direction of said recording track at locations corresponding with portions of the recordable region, said offset regions being formed to provide offset recorded data which upon reproduction include a clock signal component having a frequency bearing an integer ratio with respect to a clock frequency of said principal information signals;

reproducing the offset recorded data; and recording said principal information signals in said portions of the recordable region corresponding with said predetermined offset regions with the use of clock signals obtained from the reproduced offset recorded data such that said principal information signals and said offset recorded data are simultaneously reproducible by a single beam of light.

9. The method according to claim 8, wherein said step of recording said principal information signals comprises recording said principal information signals with the use of a recording head controlled on eh basis of said offset recorded data so that said recording head is thereby positioned to record the principal information.

10. The method according to claim 8, wherein the step of recording said principal information signals includes recording phase capturing signals thereof in a predetermined region on the recording track of said recording medium along the recording direction thereof, the phase capturing signals being recorded in phase with a clock component of said principal information signal such that the phase of said clock component is determinable from said phase capturing signals.

11. A method for reproducing principal information signals recorded along a recording direction of a recording track formed in an optical recording medium, said recording track having predetermined portions offset with respect to a width thereof representing offset recorded data including clock signal components having a frequency bearing an integer ratio with respect to a clock frequency of said principal information signals, the predetermined offset portions being positioned along the recording direction of said recording track at locations corresponding with the locations of recorded ones of said principal information signals, comprising the steps of:

reproducing said offset recorded data using a light beam;

producing clock signals from the reproduced offset data; and reproducing said principal information signals using said clock signals and said light beam simultaneously with the reproduction of corresponding ones of said offset recorded data.

12. The method according to claim 11, wherein said step of reproducing said principal information signals comprises reproducing said principal information signals with the use of a reproducing head controlled on the basis of said offset data signals so that said reproducing head is thereby positioned to reproduce the principal information signals.

13. The method according to claim 11, wherein the recording track has signals of a predetermined pattern recorded along the recording direction thereof, and wherein the step of producing said clock signals comprises producing said clock signals having a frequency determined on the basis of said offset data signals and having a phase determined by said signals of a predetermined pattern.

14. The method according to claim 11, wherein the step of reproducing said offset recorded data comprises obtaining said offset recorded data as a high frequency component of a tracking error signal.

* * * * *